US007793862B2

(12) United States Patent
Ricco et al.

(10) Patent No.: US 7,793,862 B2
(45) Date of Patent: Sep. 14, 2010

(54) FUEL-CONTROL SERVO VALVE, AND FUEL INJECTOR PROVIDED WITH SUCH SERVO VALVE

(75) Inventors: Mario Ricco, Casamassima (IT); Raffaele Ricco, Valenzano (IT); Annunziata Satriano, Valenzano (IT); Sergio Stucchi, Valenzano (IT); Onofrio De Michele, Valenzano (IT)

(73) Assignee: C.R.F. Societa Consortile per Azioni (IT)

( * ) Notice: Subject to any disclaimer, the term of this patent is extended or adjusted under 35 U.S.C. 154(b) by 301 days.

(21) Appl. No.: 11/441,641

(22) Filed: May 26, 2006

(65) Prior Publication Data

US 2006/0266846 A1 Nov. 30, 2006

(30) Foreign Application Priority Data

May 27, 2005 (EP) ................................. 05425383
May 27, 2005 (EP) ................................. 05425384
May 25, 2006 (EP) ................................. 06114551

(51) Int. Cl.
*F02M 41/16* (2006.01)
*B05B 1/30* (2006.01)
*F16K 31/02* (2006.01)

(52) U.S. Cl. .................. 239/96; 239/585.1; 239/585.4; 251/129.16

(58) Field of Classification Search .................. 239/96, 239/533.7, 533.8, 533.9, 585.1–585.5, 584, 239/88, 900, 89–92; 251/118, 119, 129.09, 251/129.1, 129.15–129.22; 123/305, 445, 123/490, 466–468
See application file for complete search history.

(56) References Cited

U.S. PATENT DOCUMENTS 2,496,804 A * 2/1950 Meitzler ..................... 239/91

(Continued)

FOREIGN PATENT DOCUMENTS

DE 38 02648 A1 8/1989

(Continued)

OTHER PUBLICATIONS

Search Report issued by European Patent Office on May 8, 2006 in connection with corresponding European application No. EP 05 42 5384.

(Continued)

*Primary Examiner*—Len Tran
*Assistant Examiner*—Steven M Cernoch
(74) *Attorney, Agent, or Firm*—Ostrolenk Faber LLP

(57) ABSTRACT

A servo valve (7) for fuel control is provided with an actuator (14) and a valve body (8, 28), which is set in a fixed position and has a stem (33) that extends along a longitudinal axis (3) and defines an internal passage (26); said internal passage (26) has at least two radial channels (39), which give out into an outlet through an outer lateral surface (34) of the stem (33) and have respective first portions (43) of calibrated length and cross section; said first portions (42) are followed by respective second portions of larger diameter; the servo valve (7) is provided with an open/close element (17), which is coupled to the outer lateral surface (34) of the stem (33) substantially in a fluid-tight way and is axially movable under the action of the actuator (14) for opening/closing the internal passage (26) of the stem (33); in the closing position, the open/close element (17) is subject to a zero axial resultant force by the pressure of the fuel.

23 Claims, 3 Drawing Sheets

U.S. PATENT DOCUMENTS

| | | | | |
|---|---|---|---|---|
| 2,746,443 | A * | 5/1956 | Meyer | 123/449 |
| 2,770,500 | A * | 11/1956 | Dickson | 239/87 |
| 2,959,360 | A * | 11/1960 | Nichols | 239/96 |
| 2,985,378 | A * | 5/1961 | Falberg | 239/96 |
| 4,598,863 | A * | 7/1986 | Kanesaka | 239/96 |
| 5,275,337 | A * | 1/1994 | Kolarik et al. | 239/91 |
| 5,894,991 | A * | 4/1999 | Edwards et al. | 239/88 |
| 5,947,380 | A | 9/1999 | Coldren et al. | |
| 6,257,499 | B1 | 7/2001 | Sturman | |
| 6,837,221 | B2 * | 1/2005 | Crofts et al. | 123/467 |
| 7,299,998 | B2 * | 11/2007 | Ricco et al. | 239/96 |
| 2002/0033423 | A1 * | 3/2002 | Ruthardt et al. | 239/89 |
| 2002/0182087 | A1 * | 12/2002 | Okii et al. | 417/222.2 |
| 2006/0011736 | A1 * | 1/2006 | Ricco et al. | 239/96 |

FOREIGN PATENT DOCUMENTS

| | | | |
|---|---|---|---|
| DE | 43 10984 | A1 | 10/1994 |
| DE | 4310984 | A1 * | 10/1994 |
| DE | 197 40997 | A1 | 3/1998 |
| EP | 0 262 539 | A1 | 9/1987 |
| EP | 0 740 068 | A2 | 4/1996 |
| EP | 0 823 549 | A2 | 2/1998 |
| EP | 1 612 403 | A1 | 1/2006 |
| EP | 1612403 | A1 * | 1/2006 |
| WO | WO 01/11227 | A1 | 2/2001 |

OTHER PUBLICATIONS

Search Report issued by European Patent Office on Nov. 8, 2006 in connection with corresponding European application No. EP 06 11 4551.

European Search Report EP 05 42 5383 dated Aug. 19, 2005.

European Search Report EP 05 42 5384 dated Aug. 19, 2005.

European Search Report EP 04 42 5475 dated Oct. 27, 2004.

* cited by examiner

FUEL-CONTROL SERVO VALVE, AND FUEL INJECTOR PROVIDED WITH SUCH SERVO VALVE

CROSS REFERENCE TO RELATED APPLICATION

This application claims the benefit of the filing date of European Patent Application No. 05425383.6 filed 27 May 2005, European Patent Application No. 05425384.4 filed 27 May 2005 and European Patent Application No. 06114551.2 filed 25 May 2006 the disclosure of which is hereby incorporated by reference The present invention relates to a fuel-control servo valve, for a fuel injector designed to be installed in an internal-combustion engine.

From the European patent application No. EP 1612403 A1, a fuel-control servo valve is known built according to the preamble of Claim 1, comprising a valve body, which is set in a fixed position, is provided with a stem, and defines an internal passage communicating with a control chamber and with an outlet made on an outer lateral surface of the aforesaid stem.

A sleeve-shaped open/close element is fitted on the stem. The open/close element is movable along the axis of the stem under the action of an actuator between an end-of-travel closing position, in which it closes the outlet of the aforesaid internal passage, and an end-of-travel opening position, in which it leaves said outlet open. The open/close element is coupled to the outer lateral surface of the stem in an axially slidable and substantially fluid-tight way and, in its end-of-travel closing position, is subjected to a zero axial resultant force by the pressure of the fuel.

In particular, the outlet of the internal passage is defined by an annular chamber made radially between the stem and the open/close element.

In particular, the servo valve described above is set within an injector, which is provided with a nozzle for injecting the fuel into an internal-combustion engine and a control rod, which is movable along an axis of its own for actuating a needle for closing of the nozzle.

The servo valve varies the pressure of the fuel in the control chamber, which is delimited axially by one end of the control rod and receives fuel under pressure from an inlet of the injector. The control chamber and the internal passage of the stem communicate with one another through a single calibrated hole, i.e., through a hole having a diameter and length obtained with extreme precision in order to determine exactly the pressure jump when the fuel flows.

The known solutions described above guarantee a good balance, in an axial direction, of the actions of pressure acting on the open/close element, when the latter is in its end-of-travel closing position.

However, known solutions of the type described above are unable to guarantee the flow of fuel at outlet from the internal passage of the stem being uniform about the axis of the stem itself.

Any possible variations in the flow rate are highly undesirable, in so far as they tend to cause variations in the times of outflow of fuel from the control chamber and, hence, in the times of opening/closing of the nozzle of the injector with respect to the conditions envisaged in the design stage.

There is consequently felt the need to improve balancing of the servo valve and improve operation and duration of the injector. In particular, the need is felt to provide an injector that not only has a servo valve of a "balanced" type, but presents characteristics such as to reduce to the minimum any possible variations of behaviour in opening/closing of the injection nozzle with respect to the conditions envisaged in the design stage.

The aim of the present invention is to provide a fuel-control servo valve which will enable the requirements set forth above to be met in a simple and economically advantageous way.

According to the present invention, a fuel-control servo valve is provided, comprising:

- actuator means;
- a valve body, which is set in a fixed position and comprises a stem, which extends along a longitudinal axis and defines an internal passage for the fuel; said internal passage comprising at least two radial channels which give out into an outlet through an outer lateral surface of said stem;
- an open/close element, which is coupled to said outer lateral surface substantially in a fluid-tight way and is axially movable under the action of said actuator means between an end-of-travel closing position, in which it closes said outlet so as to be subject to a zero axial resultant force by the pressure of the fuel, and an end-of-travel opening position, in which it leaves said outlet open;

said servo valve being characterized in that said radial channels comprise respective first portions having calibrated lengths and cross sections.

According to the present invention a fuel injector for an internal-combustion engine is moreover provided, which comprises:

- an injector body, terminating with a nozzle for injecting fuel into a corresponding cylinder of the engine;
- a movable open/close needle for opening and closing said nozzle;
- a control rod, which is housed in said injector body and is slidable along a longitudinal axis for controlling movement of said open/close needle; and
- a fuel-control servo valve, which is housed in said injector body and comprises:

a) actuator means;

b) a control chamber, which communicates with a fuel inlet and is delimited axially, on one side, by said control rod;

c) a valve body, which is set in a fixed position and comprises a stem extending along said longitudinal axis and defining an internal passage for the fuel; said internal passage communicating permanently with said control chamber and comprising at least two radial channels which give out into an outlet through an outer lateral surface of said stem; and d) an open/close element, which is coupled to said outer lateral surface substantially in a fluid-tight way and is axially movable under the action of said actuator means between an end-of-travel closing position, in which it closes said outlet so as to be subject to a zero axial resultant force by the pressure of the fuel, and an end-of-travel opening position, in which it leaves said outlet open;

said servo valve being characterized in that said radial channels comprise respective first portions having calibrated lengths and cross sections.

For a better understanding of the present invention, a preferred embodiment is now described, purely by way of non-limiting example, with reference to the attached plate of drawings, wherein.

Figure 1:
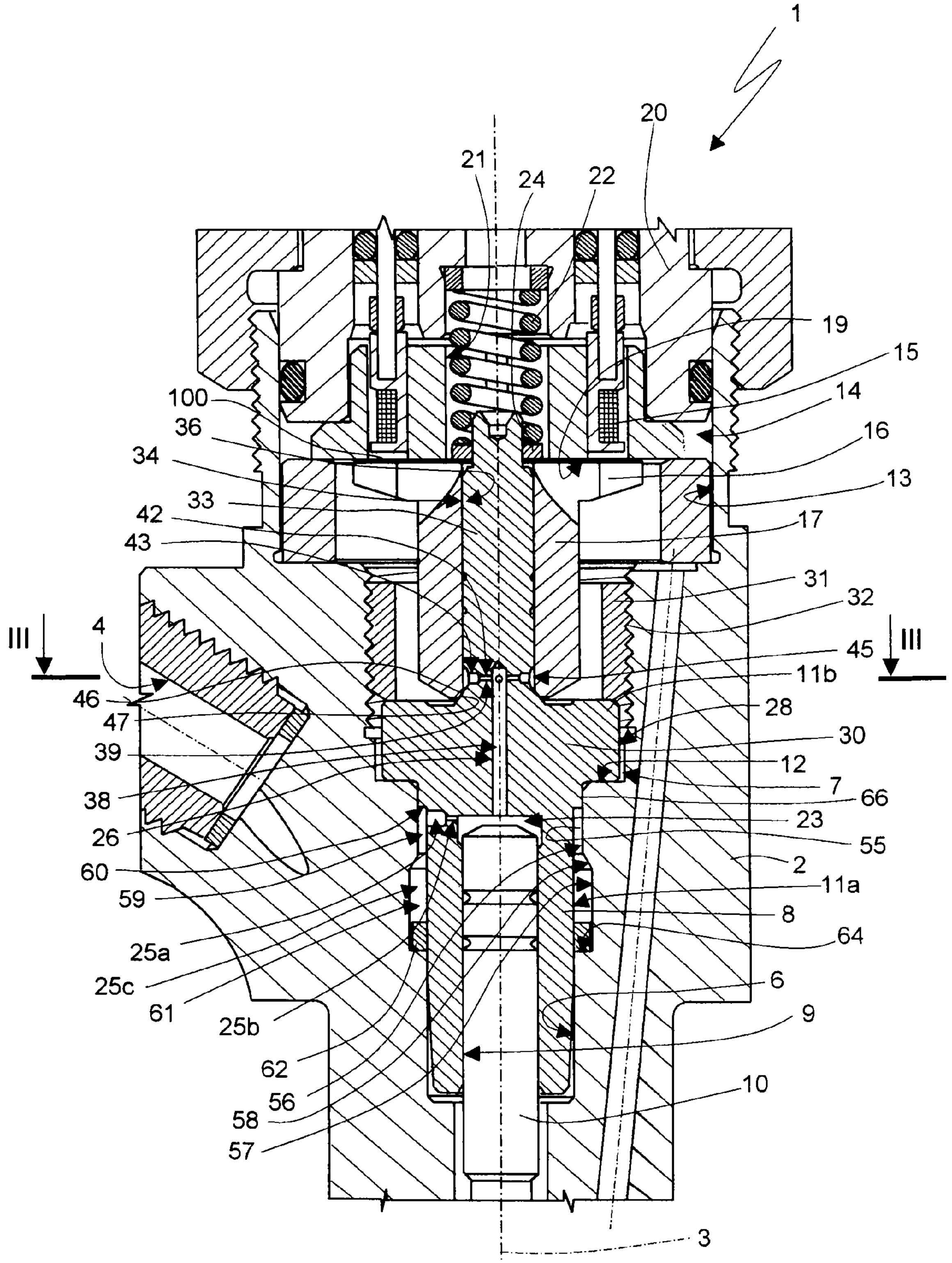
FIG. 1 is a cross-sectional view, with parts removed for clarity, of a fuel injector provided with a preferred embodiment of the control servo valve according to the present invention.

In FIG. 1, the reference number 1 designates, as a whole, a fuel injector (partially illustrated) for an internal-combustion engine, in particular a diesel engine (not illustrated).

The injector 1 comprises a hollow body or casing 2, commonly referred to as "injector body", which extends along a longitudinal axis 3, and has a side inlet 4 designed to be connected to a delivery pipe for delivery the fuel at a high pressure, for example at a pressure in the region of 1800 bar. The casing 2 terminates with a nozzle (not illustrated), which communicates with the inlet 4 and is designed to inject the fuel into a corresponding cylinder of the engine.

The casing 2 defines an axial cavity 6, housed in which is a metering servo valve 7 comprising a hollow cylindrical body flanged on the outside, commonly referred to as "valve body" and designated by the reference number 8.

The body 8 comprises a tubular portion 11*a* defining an axial hole 9, in which a control rod 10 is axially slidable in a fluid-tight way. In particular, the rod 10 is axially movable in the hole 9 so as to control in a known way an open/close needle (not illustrated), which closes and opens the injection nozzle.

The portion 11*a* is delimited on the outside by a cylindrical surface, projecting from which is a centring projection 66 coupled to an internal surface 55 of the body 2.

The body 2 is provided with another cavity 13, which is coaxial to the cavity 6 and houses an actuator device 14, comprising an electromagnet 15 designed to control a notched disk-shaped anchor 16, which terminates axially with a sleeve 17. In particular, the electromagnet 15 is formed by a magnetic core, has a contrast surface 19 perpendicular to the axis 3 and is kept in position by a support 20.

The device 14 has an axial cavity 21, housed in which is a helical compression spring 22, preloaded so as to exert an action of thrust on the anchor 16, in a direction opposite to that of attraction exerted by the electromagnet 15. In particular, the spring 22 has one end resting against the support 20 and another end acting on the anchor 16 through a washer 24.

The servo valve 7 then comprises a control or metering chamber 23, which is delimited radially by the portion 11*a* and communicates permanently with the inlet 4, for receiving fuel under pressure through a channel 25*a*, which is made in the portion 11*a* itself and is provided with a calibrated portion 25*b*, through an annular chamber 25*c*, which is delimited radially by the portion 11*a* and by the surface 55, and through a passage (not illustrated) made in the body 2.

Hereinafter, by "calibrated portion" or "calibrated hole" are meant holes that have a cross section and a length obtained with extreme precision so as to set a pre-determined pressure difference between the inlet and the outlet of the holes themselves.

The body 8 is made of a single piece and comprises, in addition to the portion 11*a*, an intermediate axial portion 30, which defines the bottom of the hole 9; i.e., it delimits the chamber 23 axially on the opposite side of the rod 10.

The portion 30 terminates radially outwards with a flange 11*b*, which projects radially with respect to the projection 66, is arranged axially so that it rests directly against a shoulder 12 of the cavity 6 and is gripped axially so as to guarantee the fluid tightness against the shoulder 12 by a threaded ring nut 31, screwed on an internal thread 32 of the body 2.

The body 8 further comprises a stem 33, which extends in cantilever fashion from the portion 30 along the axis 3 towards the cavity 21 and is delimited externally by a cylindrical lateral surface 34, which guides axial sliding of the sleeve 17. In particular, the sleeve 17 has an internal cylindrical surface 36, coupled to the lateral surface 34 substantially in a fluid-tight way, via coupling with appropriate diametral play, for example, less than 4 μm, or else by interposition of seal elements.

The chamber 23 communicates with a passage for outlet or discharge of the fuel, designated as a whole by 26, which is made entirely within the body 8. The passage 26 comprises a portion 38 defined by a blind cylindrical hole made along the axis 3 partly in the portion 30 and partly in the stem 33, and four radial channels 39 (FIG. 3), which are made in the stem 33 in positions set at equal distances apart from one another about the axis 3 and give out through the lateral surface 34.

The radial channels 39 are substantially cylindrical and, preferably, have axes that lie in one and the same plane orthogonal to the axis 3 and are set at equal distances apart from one another about the axis 3. According to the invention, the radial channels 39 comprise respective calibrated portions 42 (in the sense explained above), which extend starting from the portion 38. Preferably, the portions 42 all have the same diameter and the same radial length. The radial channels 39 terminate with respective portions 43, which have a larger diameter than the portions 42 and are radiused to the corresponding portions 42.

The portions 43 give out from the stem 33 into an annular chamber 45, which is made on the lateral surface 34 in an axial position adjacent to the portion 30 and is opened/closed by axial sliding of the sleeve 17. The sleeve 17 performs the function of open/close element and is movable between an advanced end-of-travel position, in which it closes the outlet of the passage 26, and is set so that it bears axially, at one end 46 thereof, upon a conical shoulder 47 of the body 8, between the portion 30 and the stem 33, and a retracted end-of-travel position, in which the anchor 16 is set so that it bears axially upon the surface 19 by means of interposition of a plate 100, which defines the residual air gap between the anchor 16 and the electromagnet 15. In this retracted end-of-travel position, the anchor 16 sets the chamber 45 in communication with a discharge pipe of the injector (not illustrated), through an annular passage between the ring nut 31 and the sleeve 17, the notches of the anchor 16, the cavity 21 and an opening of the support 20.

In other words, excitation of the electromagnet 15 displaces the anchor 16, and, consequently, the open/close element 17, towards the electromagnet 15 so as to discharge the fuel from the chamber 23 and reduce its pressure in order to cause axial displacement of the rod 10 and hence control the injection nozzle. Instead, if the electromagnet 15 is de-excited, the spring 22 pushes the anchor 16, and hence the open/close element 17, into the advanced end-of-travel position.

In said advanced end-of-travel position, the fuel exerts on the sleeve 17*a* an axial resultant thrust that is substantially zero, since the pressure in the chamber 45 acts only radially on the surface 34.

According to what is illustrated in FIG. 1, the internal surface 55 of the body 2 comprises two cylindrical surfaces 56, 57 joined to one another by a conical surface 58, which converges axially towards the surface 56 and the projection 66.

Consequently, the chamber 25*c* comprises an annular port 59 delimited on the outside by the surface 56 and, axially, by an annular shoulder 60 which defines the projection 66, and an annular port 61, which is delimited on the outside by the surface 57 and houses a seal ring 62, which is set between the portion 11*a* and the surface 57, and is set so that it bears axially upon an annular shoulder 64 of the body 2.

The port 59 has radial dimensions smaller than those of the port 61, the result being that the ideal circumference in which fluid tightness between the flange 11*b* and the shoulder 12 is ensured is closer to the axis 3 as compared to the case where the surface 56 were to have the same diameter as the surface 57, the other geometrical and dimensional conditions being the same.

Consequently, the area of the body 8 on which the pressure of the fuel housed in the chamber 25*c* acts axially is smaller, and, consequently, also the axial forces acting on the body 8 itself towards the anchor 16 are smaller.

Figure 2:
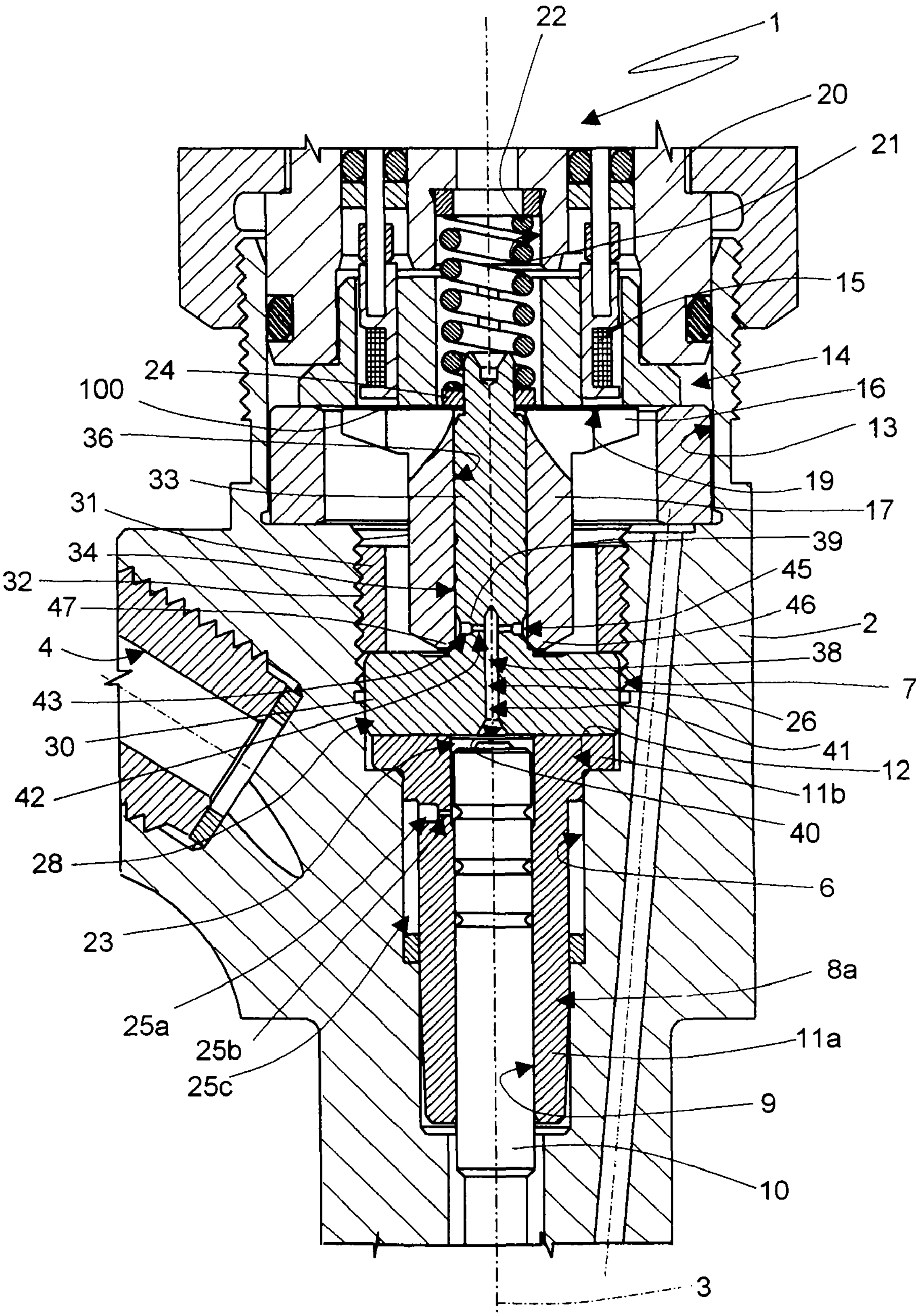
FIG. 2 is similar to FIG. 1 and shows a variant of the injector of FIG. 1.

FIG. 2 shows a variant of the injector 1, the components of which are designated where possible by the same reference numbers as those used in FIG. 1.

Unlike what is represented in FIG. 1, the surface 58 is absent, that is, the surface 55 has a constant diameter, whilst the portion 11*a* and the flange 11*b* are integrated in a tubular body 8*a* distinct from the stem 33. The body 8*a* defines the axial hole 9, in which the control rod 10 is axially slidable in a fluid-tight way, whilst the flange 11*b* is set so that it rests against the shoulder 12 of the cavity 6. Once again with reference to FIG. 2, the chamber 23 is set in communication with the supply channel 25*a* by means of an increase in the diameter of the hole 9 at the axial end of the hole 9.

The stem 33 and the portion 30, instead, form part of a body 28, which is made of a single piece, is coaxial to the body 8*a*, and is set axially between the chamber 23 and the actuator device 14. In particular, the portion 30 defines a base of the body 28, is axially pack-tightened against the flange 11*b* by means of the threaded ring nut 31, and has a larger diameter than the stem 33.

Figure 3:
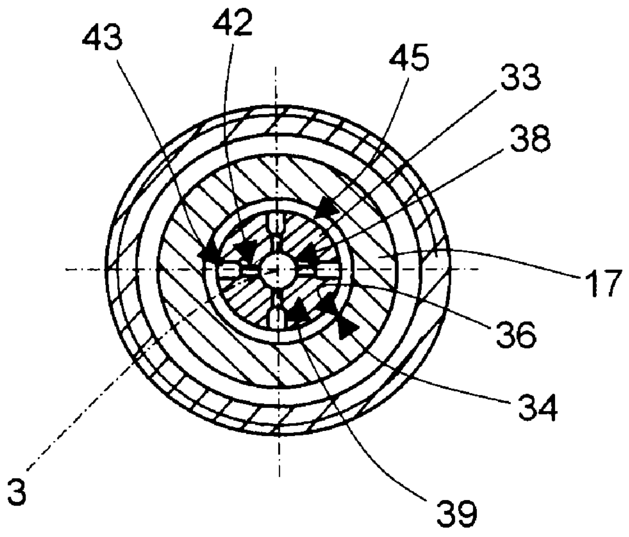
FIG. 3 is a component of the servo valve of FIG. 1, in a cross-sectional view, according to the line of section III-III of FIG. 1.
Figure 4:
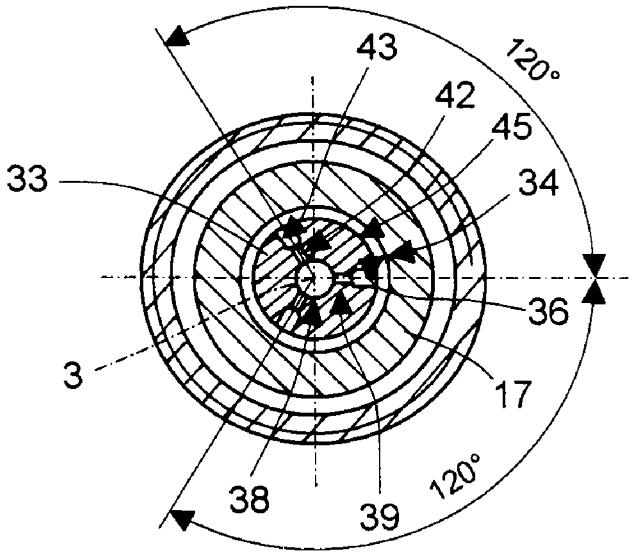
FIG. 4 is similar to FIG. 3 and shows a variant of the servo valve of FIG. 1.

FIG. 4 shows a variant of the valve 7, the components of which are designated where possible by the same reference numbers as those used in FIG. 3: in this variant the channels 39 are three in number and are set at an angular distance of 120° apart from one another about the axis 3.

The advantages of the servo valve 7 and the injector 1 are outlined in what follows.

By envisaging a number of calibrated portions 42 of at least two, it is possible to bestow upon the valve 7 a symmetry from the fluid-dynamic standpoint, which entails:

- symmetrical states of stress, in particular for the stem 33, with a consequent better balancing of the stresses/strains induced by the fuel under pressure contained within of the body 8, 28, in particular around the portion 38; and
- a higher uniformity of the flow through the sealing area between the end 46 of the open/close element 17 and the shoulder 47 of the body 8, 28, with a consequent balancing of the axial thrust acting on the open/close element 17 even when the latter is open.

Furthermore, the positions and dimensions of the portions 42, in combination with a sufficient value of the travel of the open/close element 17, enable the flow rate of fuel through the same portions 42 and through the sealing area between the end 46 of the open/close element 17 and the shoulder 47 of the body 8, 28 to be swirling and/or cavitating. Positioning of the portions 42 in the proximity of the aforesaid sealing area enables reduction to the minimum of the volume comprised between the area itself and the outlet from the portions 42, contributing in an appreciable way to maintaining a swirling and/or cavitating flow.

Also the portions 43, when present, do not introduce any significant increase in volume downstream of the portions 42. Since they have a cross section greater than that of the portions 42, they introduce a detachment of the fluid thread from the wall in the passage from the portion 42 to the portion 43 and consequently contribute to generating an effect of cavitation at the outlet into the chamber 45.

As an alternative to what has just been set forth above, the effect of cavitation could result from a particular geometry of the chamber 45.

In the presence of the aforesaid swirling and/or cavitating regime, the fuel flow rate at outlet from the passage 26 is not affected by the pressure conditions of the environment in which the sleeve 17 is displaced, nor by the variation in the travel of the sleeve 17 (provided that it does not drop below a certain threshold value), thus preventing the flow rate of the fuel leaving by the chamber 23 from varying over time and/or with respect to what is envisaged in the design stage as a function of the conditions downstream. Any possible variation of flow rate is in fact highly undesirable in so far as it would cause variations in the times for outflow of fuel from the chamber 23 and, hence, in the times for opening/closing of the injector nozzle 1 with respect to the conditions envisaged in the design stage.

Any variations in the times for outflow of fuel and, hence, in the times for opening/closing of the nozzle with respect to the conditions envisaged in the design stage are reduced also by containing the static drifts of the axial position of the various portions housed in the body 2.

In fact, the high pressures present during operation in the chamber 25*c* tend in general to cause a static drift in the axial position of the portion 30 in the direction of the anchor 16, with consequent reduction in the maximum travel of the anchor 16 and the sleeve 17. As has been said previously, if on account of said static drift the travel of the anchor 16 and of the sleeve 17 were to drop below a threshold value (which is a function of the supply pressure of the injector), the flow through the portions 42 would no longer be cavitating and/or swirling: as a result of this, the fuel flow rate would become a function of the size of the section of passage between the end 46 of the open/close element 17 and the shoulder 47 of the body 8, 28, with consequent variation in the flow rate of fuel leaving the chamber 23 with respect to what is envisaged in the design stage.

With reference to the solution of FIG. 1, in the first place, containment of the static drifts is due to a high rigidity of the set of the portions 11*a*, 11*b*, 30, 33, which is obtained thanks to the fact that said portions are made of a single piece to form the body 8.

In the second place, containment of the static drifts is obtained by restricting the radial dimension of the port 59 with respect to that of the port 61, and hence by reducing the axial forces exerted by the pressure on the body 8 in the direction of the anchor 16, as explained in detail above.

With reference to the solution of FIG. 2, containment of the static drifts is due to the absence of other elements between the bodies 8*a*, 28.

Said absence, in addition to reducing the number of static drifts towards the low-pressure environment, enables reduction in the overall dimensions in an axial direction of the servo valve 7 and considerable simplification in the construction of the injector 1, in so far as it enables avoidance of any complex finishing and/or surface-hardening processes, which would be necessary to guarantee the precision and machining tolerances required for providing tightness in the metal-metal contact fits at high pressures.

Finally, it is clear that modifications and variations may be made to the servo valve 7 and to the injector 1 described and illustrated herein, without thereby departing from the scope of the present invention, as defined in the annexed claims.

In particular, in the solution of FIG. 2 an adjustment spacer set axially between the bodies 8*a* and 28 could be provided, even though in this case additional finishing and surface-hardening processes would be required.

The electromagnet 15 could be replaced by a piezoelectric actuator, which, when subjected to a voltage, increases its own axial dimension in order to actuate the sleeve 17 in such a way as to open the outlet of the passage 26. In this case, the spring 22 would be set axially between the sleeve 17 and the portion 30, and the chamber 45 and the shoulder 47 could be made in a position adjacent to the free end of the stem 33.

In addition, the chamber 45 could be dug at least in part in the surface 36, but always with a conformation such that the open/close element defined by the sleeve 17 is subject to a zero resultant force of pressure along the axis 3 when it is set in an end-of-travel closing position.

The axes of the channels 39 could lie in planes that are different from one another, and/or could not be all set at equal distances apart from one another about the axis 3, and/or the portions 43 could be absent; in this case the channels 39 would completely define respective calibrated holes.

The portions 42 could have cross sections and/or diameters different from one another, but once again calibrated so as to generate appropriate pressure jumps that determine a flow rate of fuel that is distributed in a balanced way about the axis 3 and is constant in time.

The number of the portions 42 made in the stem 33 could differ from the one indicated by way of example, but once again at least equal to two in order to contribute to balancing of the servo valve 7 in a radial direction with respect to the axis 3.

The internal passage 26 could not be coaxial with the hole 9, in the case where the portions 42 have diameters different to one another so as to compensate for asymmetries from the standpoint of structural strength.

The axes of the radial channels 39 could form an angle other than 90° with respect to the longitudinal axis.

The axis of the portion 38 could be parallel and set at a distance from the axis 3 of the valve body 8, 28.

The invention claimed is:

1. A control servo valve for the controlling a fuel injector, comprising:

a valve body having a tubular portion extending along a longitudinal axis and radially delimiting a control chamber communicating with an inlet of high pressure fuel, said valve body being set in a fixed position and comprising a stem extending along said longitudinal axis opposite said tubular portion;

an outlet passage provided internally to said valve body and communicating permanently with said control chamber, said outlet passage comprising at least two radial channels giving out into an annular outlet chamber through an outer lateral surface of said stem;

an open/close tubular element coupled to said outer lateral surface substantially in a fluid-tight way and axially movable with respect to said stem, said tubular element being normally held by elastic means on an end-of-travel closing position, in which it closes said annular outlet chamber so as to be subject to a zero axial resultant force by the pressure of said high pressure fuel; and electro actuating means operable to axially move said tubular element against the urge of said elastic means from said end-of-travel closing position to an end-of-travel opening position, in which it leaves said annular outlet chamber open;

wherein said radial channels each comprise respective first tubular portions having calibrated lengths and diameters, and respective second tubular portions having diameters larger than the diameter of the corresponding first portions, the respective first and second tubular portions of each radial channel extending linearly and being coaxial with each other and wherein the second tubular portions always give out into the annular outlet chamber.

2. The servo valve according to claim 1, characterized in that said first portions have the same calibrated length and the same calibrated diameter.

3. The servo valve according to claim 1 characterized in that said radial channels have a calibrated diameter that is constant throughout their length.

4. The servo valve according to claim 1, characterized in that said first portions are radially more internal with respect to the corresponding second portions.

5. The servo valve according to claim 1, characterized in that said radial channels are set at equal distances apart from one another about said longitudinal axis.

6. The servo valve according to claim 1, characterized in that the axes of said radial channels lie in one and the same plane orthogonal to said longitudinal axis.

7. The servo valve according to claim 1, characterized in that the axes of said radial channels form an angle other than 90° with respect to said longitudinal axis.

8. The servo valve according to claim 1, characterized in that said outlet is defined by an annular chamber made radially between said stem and said open/close element.

9. The servo valve according to claim 1, characterized in that said radial channels are three in number.

10. The servo valve according to claim 1, characterized in that said radial channels are four in number.

11. The servo valve according to claim 1, wherein said body is made in a single piece and comprises also an intermediate axial portion axially delimiting the bottom of said control chamber, said outlet passage comprising an axial blind portion communicating with said radial-channels and made partly in said intermediate portion and partly in said stem.

12. The servo valve according to claim 11, wherein said intermediate portion terminates radially outwards with a-flange arranged axially so that it rests directly on a fixed shoulder where it is gripped axially so as to guarantee a fluid tightness therewith.

13. The servo valve according to claim 11, wherein said actuating means comprise an electromagnet designed to control a notched disk-shaped anchor terminating axially with said tubular element, said electromagnet being formed by a magnetic core having a polar surface perpendicular to said axis and engageable by said disk-shaped anchor.

14. A fuel injector for an internal-combustion engine, comprising:

an injector body terminating with a nozzle for injecting fuel into a corresponding cylinder of the engine;

a movable open/close needle for opening and closing said nozzle;

a control rod housed in said injector body and slidable along a longitudinal axis for controlling the movement of said open/close needle; and a fuel-control servo valve housed in said injector body;

said servo valve comprising:

a) a valve body having a tubular portion extending along a longitudinal axis and radially delimiting a control chamber communicating with an inlet of high pressure fuel, said control chamber being delimited axially on one side by said control rod, said valve body being set in a fixed position in said injector body and comprising a stem extending along said longitudinal axis opposite said tubular portion;

b) an outlet passage provided internally to said valve body and communicating permanently with said control chamber, said outlet passage comprising at least two radial channels giving out into an annular outlet chamber through an outer lateral surface of said stem;

c) an open/close tubular element coupled to said outer lateral surface substantially in a fluid-tight way and axially movable with respect to said stem, said tubular element being normally held by elastic means on an end-of-travel closing position, in which it closes said annular outlet chamber so as to be subject to a zero axial resultant force by the pressure of said high pressure fuel; and d) electro actuating means operable to axially move said tubular element against the urge of said elastic means from said end-of-travel closing position to an end-of-travel opening position, in which it leaves said outlet chamber open;

wherein said radial channels each comprise respective first tubular portions having calibrated lengths and diameters, and respective second tubular portions having diameters larger than the diameter of the corresponding first portions, the respective first and second tubular portions of each radial channel extending linearly and being coaxial with each other and wherein the second tubular portions always give out into the annular outlet chamber.

15. The injector according to claim 14, characterized in that said valve body delimits axially said control chamber on the axial side opposite to that of said control rod.

16. The injector according to claim 15, characterized in that said control chamber is delimited radially by a tubular portion; said tubular portion and said stem forming part of a valve body made of a single piece.

17. The injector according to claim 15, characterized in that said valve body comprises an external flange gripped axially and in a fluid-tight way directly against a shoulder of said injector body.

18. The injector according to claim 14, characterized in that said internal passage comprises a portion sharing the same axis as that of said valve body.

19. The injector according to claim 14, characterized in that said internal passage comprises a parallel portion, set at a distance from the axis of said valve body.

20. The injector according to claim 14, wherein said valve body is housed in an axial cavity of said injector body, said tubular portion is delimited by a cylindrical surface projecting from which is a centering projection cooperating with said cavity.

21. The injector according to claim 20, wherein said injector body includes an intermediate portion terminating radially outwards with a flange arranged axially so that it rests directly on a shoulder of said injector body where it is gripped axially by means of a ring nut screwed on an internal thread of said injector body so as to guarantee a fluid tightness between said flange and said shoulder.

22. A servo valve for fuel control comprising:

an actuator;

a valve body, which is set in a fixed position and comprises a stem extending along a longitudinal axis and defining an internal passage for the fuel; said internal passage comprising at least two radial channels which give out into an annular outlet chamber through an outer lateral surface of said stem; and an open/close element, which is coupled to said outer lateral surface substantially in a fluid-tight way and is axially movable under the action of said actuator means between an end-of-travel closing position, in which it closes said annular outlet chamber so as to be subject to a zero axial resultant force by the pressure of the fuel, and an end-of-travel opening position, in which it leaves said annular outlet chamber open, said open/close element being in the end of travel closing position without action of said actuator;

said servo valve being characterized in that said radial channels comprise respective first portions having calibrated lengths and diameters, wherein said radial channels give out into the annular outlet chamber and through an outer lateral surface of said stem, said radial channels further comprise respective second portions having diameters larger than the diameter of the corresponding first portions, the radial channels with first and second portions and annular outlet chamber and outer lateral surface positioned between said stem and the open/close element and wherein the respective second portions always give out into the annular outlet chamber.

23. A fuel injector for an internal-combustion engine comprising:

an injector body terminating with a nozzle for injecting fuel into a corresponding cylinder of the engine;

a movable open/close needle for opening and closing said nozzle;

a control rod, which is housed in said injector body and is slidable along a longitudinal axis for controlling the movement of said open/close needle; and a fuel-control servo valve, which is housed in said injector body and comprises:

a) an actuator;

b) a control chamber, which communicates with a fuel inlet and is delimited axially, on one side, by said control rod;

c) a valve body, which is set in a fixed position and comprises a stem extending along said longitudinal axis and defining an internal passage for the fuel; said internal passage communicating permanently with said control chamber and comprising at least two radial channels which give out into an annular outlet chamber through an outer lateral surface of said stem; and d) an open/close element, which is coupled to said outer lateral surface substantially in a fluid-tight way and is axially movable under the action of said actuator means between an end-of-travel closing position, in which it closes said annular outlet chamber so as to be subject to a zero axial resultant force by the pressure of the fuel, and an end-of-travel opening position, in which it leaves said annular outlet chamber open, said open/close element being in the end of travel closing position without action of said actuator;

said injector being characterized in that said radial channels comprise respective first tubular portions having calibrated lengths and cross sections, wherein said radial channels always give out into the chamber outlet and through an outer lateral surface of said stem, said radial channels further comprise respective second tubular portions having diameters larger than the diameter of the corresponding first portions, the radial channels with first and second portions and chamber outlet and outer lateral surface positioned between said stem and the open/close element and the second tubular portions always giving out into the annular outlet chamber.

* * * * *